US012568311B2

(12) United States Patent
Azoulai et al.

(10) Patent No.: US 12,568,311 B2
(45) Date of Patent: *Mar. 3, 2026

(54) POINT OF VIEW ABERRATIONS CORRECTION IN A SCANNING FOLDED CAMERA

(71) Applicant: Corephotonics Ltd., Tel Aviv (IL)

(72) Inventors: Itamar Azoulai, Tel Aviv (IL); Gal Safra, Tel Aviv (IL); Anat Werbner, Tel Aviv (IL); Ela Yehudayi, Tel Aviv (IL); Paz Ilan, Tel Aviv (IL); Nadav Geva, Tel Aviv (IL); Noy Cohen, Tel Aviv (IL); Gal Shabtay, Tel Aviv (IL); Ephraim Goldenberg, Tel Aviv (IL); Ruthy Katz, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/805,581

(22) Filed: Aug. 15, 2024

(65) Prior Publication Data

US 2024/0406558 A1 Dec. 5, 2024

Related U.S. Application Data

(63) Continuation of application No. 18/064,269, filed on Dec. 11, 2022, now Pat. No. 12,108,151, which is a
(Continued)

(51) Int. Cl.
*H04N 23/68* (2023.01)
*G02B 7/18* (2021.01)
(Continued)

(52) U.S. Cl.
CPC ......... *H04N 23/683* (2023.01); *G02B 7/1805* (2013.01); *G02B 27/0081* (2013.01);
(Continued)

(58) Field of Classification Search
CPC .. G06T 5/006; G06T 7/80; G06T 3/40; G06T 2207/30244; H04N 23/45; H04N 23/81;
(Continued)

(56) References Cited

U.S. PATENT DOCUMENTS 3,085,354 A 4/1963 Rasmussen et al.
3,584,513 A 6/1971 Gates
(Continued)

FOREIGN PATENT DOCUMENTS

CN 101276415 A 10/2008
CN 201514511 U 6/2010
(Continued)

OTHER PUBLICATIONS

Zitova Bet Al: "Image Registration Methods: a Survey", Image and Vision Computing, Elsevier, Guildford, GB, vol. 21, No. 11, Oct. 1, 2003 (Oct. 1, 2003), pp. 977-1000, XP00i 189327, ISSN: 0262-8856, DOI: i0_i0i6/ S0262-8856(03)00137-9.
(Continued)

*Primary Examiner* — James T Boylan
(74) *Attorney, Agent, or Firm* — Nathan & Associates; Menachem Nathan

(57) ABSTRACT

Systems and methods for correcting point of view (POV) aberrations in scanning folded cameras and multi-cameras including such scanning folded cameras. In a Tele folded camera that includes an optical path folding element (OPFE) and an image sensor, the OPFE is tilted in one or two directions to direct the Tele folded camera towards a POV of a scene, a Tele image or a stream of Tele images is captured from the POV, the Tele image having POV aberrations and the POV aberrations are digitally corrected to obtain an aberration-corrected image or stream of images.

20 Claims, 7 Drawing Sheets

Related U.S. Application Data continuation of application No. 17/633,204, filed as application No. PCT/IB2021/056311 on Jul. 13, 2021, now Pat. No. 11,910,089.

(60) Provisional application No. 63/051,993, filed on Jul. 15, 2020.

(51) Int. Cl.

| | |
|---|---|
| *G02B 27/00* | (2006.01) |
| *G02B 27/64* | (2006.01) |
| *G03B 5/00* | (2021.01) |
| *G06T 3/40* | (2006.01) |
| *G06T 5/80* | (2024.01) |
| *G06T 7/80* | (2017.01) |
| *H04N 23/45* | (2023.01) |
| *H04N 23/698* | (2023.01) |
| *H04N 23/81* | (2023.01) |
| *G03B 30/00* | (2021.01) |
| *H04N 17/00* | (2006.01) |

(52) U.S. Cl.
CPC ............. *G02B 27/646* (2013.01); *G03B 5/00* (2013.01); *G06T 3/40* (2013.01); *G06T 5/80* (2024.01); *G06T 7/80* (2017.01); *H04N 23/45* (2023.01); *H04N 23/681* (2023.01); *H04N 23/698* (2023.01); *H04N 23/81* (2023.01); *G03B 30/00* (2021.01); *G03B 2205/003* (2013.01); *G06T 2207/30244* (2013.01); *H04N 17/002* (2013.01)

(58) Field of Classification Search
CPC . H04N 23/698; G02B 7/1805; G02B 27/0081
See application file for complete search history.

(56) References Cited

U.S. PATENT DOCUMENTS

| | | | |
|---|---|---|---|
| 3,941,001 A | 3/1976 | LaSarge | |
| 4,199,785 A | 4/1980 | McCullough et al. | |
| 4,792,822 A | 12/1988 | Akiyama et al. | |
| 5,005,083 A | 4/1991 | Grage et al. | |
| 5,032,917 A | 7/1991 | Aschwanden | |
| 5,041,852 A | 8/1991 | Misawa et al. | |
| 5,051,830 A | 9/1991 | von Hoessle | |
| 5,099,263 A | 3/1992 | Matsumoto et al. | |
| 5,248,971 A | 9/1993 | Mandl | |
| 5,287,093 A | 2/1994 | Amano et al. | |
| 5,331,465 A | 7/1994 | Miyano | |
| 5,394,520 A | 2/1995 | Hall | |
| 5,436,660 A | 7/1995 | Sakamoto | |
| 5,444,478 A | 8/1995 | Lelong et al. | |
| 5,459,520 A | 10/1995 | Sasaki | |
| 5,502,537 A | 3/1996 | Utagawa | |
| 5,657,402 A | 8/1997 | Bender et al. | |
| 5,682,198 A | 10/1997 | Katayama et al. | |
| 5,768,443 A | 6/1998 | Michael et al. | |
| 5,892,855 A | 4/1999 | Kakinami et al. | |
| 5,926,190 A | 7/1999 | Turkowski et al. | |
| 5,940,641 A | 8/1999 | McIntyre et al. | |
| 5,982,951 A | 11/1999 | Katayama et al. | |
| 6,101,334 A | 8/2000 | Fantone | |
| 6,128,416 A | 10/2000 | Oura | |
| 6,148,120 A | 11/2000 | Sussman | |
| 6,201,533 B1 | 3/2001 | Rosenberg et al. | |
| 6,208,765 B1 | 3/2001 | Bergen | |
| 6,211,668 B1 | 4/2001 | Duesler et al. | |
| 6,215,299 B1 | 4/2001 | Reynolds et al. | |
| 6,222,359 B1 | 4/2001 | Duesler et al. | |
| 6,268,611 B1 | 7/2001 | Pettersson et al. | |
| 6,341,901 B1 | 1/2002 | Iwasa et al. | |
| 6,520,643 B1 | 2/2003 | Holman et al. | |
| 6,549,215 B2 | 4/2003 | Jouppi | |
| 6,611,289 B1 | 8/2003 | Yu et al. | |
| 6,643,416 B1 | 11/2003 | Daniels et al. | |
| 6,650,368 B1 | 11/2003 | Doron | |
| 6,680,748 B1 | 1/2004 | Monti | |
| 6,714,665 B1 | 3/2004 | Hanna et al. | |
| 6,724,421 B1 | 4/2004 | Glatt | |
| 6,738,073 B2 | 5/2004 | Park et al. | |
| 6,741,250 B1 | 5/2004 | Furlan et al. | |
| 6,750,903 B1 | 6/2004 | Miyatake et al. | |
| 6,778,207 B1 | 8/2004 | Lee et al. | |
| 7,002,583 B2 | 2/2006 | Rabb, III | |
| 7,015,954 B1 | 3/2006 | Foote et al. | |
| 7,038,716 B2 | 5/2006 | Klein et al. | |
| 7,199,348 B2 | 4/2007 | Olsen et al. | |
| 7,206,136 B2 | 4/2007 | Labaziewicz et al. | |
| 7,248,294 B2 | 7/2007 | Slatter | |
| 7,256,944 B2 | 8/2007 | Labaziewicz et al. | |
| 7,305,180 B2 | 12/2007 | Labaziewicz et al. | |
| 7,339,621 B2 | 3/2008 | Fortier | |
| 7,346,217 B1 | 3/2008 | Gold, Jr. | |
| 7,365,793 B2 | 4/2008 | Cheatle et al. | |
| 7,411,610 B2 | 8/2008 | Doyle | |
| 7,424,218 B2 | 9/2008 | Baudisch et al. | |
| 7,509,041 B2 | 3/2009 | Hosono | |
| 7,533,819 B2 | 5/2009 | Barkan et al. | |
| 7,619,683 B2 | 11/2009 | Davis | |
| 7,738,016 B2 | 6/2010 | Toyofuku | |
| 7,773,121 B1 | 8/2010 | Huntsberger et al. | |
| 7,809,256 B2 | 10/2010 | Kuroda et al. | |
| 7,880,776 B2 | 2/2011 | LeGall et al. | |
| 7,918,398 B2 | 4/2011 | Li et al. | |
| 7,964,835 B2 | 6/2011 | Olsen et al. | |
| 7,978,239 B2 | 7/2011 | Deever et al. | |
| 8,115,825 B2 | 2/2012 | Culbert et al. | |
| 8,149,327 B2 | 4/2012 | Lin et al. | |
| 8,154,610 B2 | 4/2012 | Jo et al. | |
| 8,238,695 B1 | 8/2012 | Davey et al. | |
| 8,274,552 B2 | 9/2012 | Dahi et al. | |
| 8,390,729 B2 | 3/2013 | Long et al. | |
| 8,391,697 B2 | 3/2013 | Cho et al. | |
| 8,400,555 B1 | 3/2013 | Georgiev et al. | |
| 8,439,265 B2 | 5/2013 | Ferren et al. | |
| 8,446,484 B2 | 5/2013 | Muukki et al. | |
| 8,483,452 B2 | 7/2013 | Ueda et al. | |
| 8,514,491 B2 | 8/2013 | Duparre | |
| 8,547,389 B2 | 10/2013 | Hoppe et al. | |
| 8,553,106 B2 | 10/2013 | Scarff | |
| 8,587,691 B2 | 11/2013 | Takane | |
| 8,619,148 B1 | 12/2013 | Watts et al. | |
| 8,752,969 B1 | 6/2014 | Kane et al. | |
| 8,803,990 B2 | 8/2014 | Smith | |
| 8,896,655 B2 | 11/2014 | Mauchly et al. | |
| 8,976,255 B2 | 3/2015 | Matsuoto et al. | |
| 9,019,387 B2 | 4/2015 | Nakano | |
| 9,025,073 B2 | 5/2015 | Attar et al. | |
| 9,025,077 B2 | 5/2015 | Attar et al. | |
| 9,041,835 B2 | 5/2015 | Honda | |
| 9,137,447 B2 | 9/2015 | Shibuno | |
| 9,185,291 B1 | 11/2015 | Shabtay et al. | |
| 9,215,377 B2 | 12/2015 | Sokeila et al. | |
| 9,215,385 B2 | 12/2015 | Luo | |
| 9,270,875 B2 | 2/2016 | Brisedoux et al. | |
| 9,286,680 B1 | 3/2016 | Jiang et al. | |
| 9,344,626 B2 | 5/2016 | Silverstein et al. | |
| 9,360,671 B1 | 6/2016 | Zhou | |
| 9,369,621 B2 | 6/2016 | Malone et al. | |
| 9,413,930 B2 | 8/2016 | Geerds | |
| 9,413,984 B2 | 8/2016 | Attar et al. | |
| 9,420,180 B2 | 8/2016 | Jin | |
| 9,438,792 B2 | 9/2016 | Nakada et al. | |
| 9,485,432 B1 | 11/2016 | Medasani et al. | |
| 9,578,257 B2 | 2/2017 | Attar et al. | |
| 9,618,748 B2 | 4/2017 | Munger et al. | |
| 9,681,057 B2 | 6/2017 | Attar et al. | |
| 9,723,220 B2 | 8/2017 | Sugie | |
| 9,736,365 B2 | 8/2017 | Laroia | |
| 9,736,391 B2 | 8/2017 | Du et al. | |
| 9,768,310 B2 | 9/2017 | Ahn et al. | |
| 9,800,798 B2 | 10/2017 | Ravirala et al. | |

(56) References Cited

U.S. PATENT DOCUMENTS

| | | |
|---|---|---|
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 10,567,641 B1 * | 2/2020 | Rueckner .............. H04N 23/62 |
| 10,645,286 B2 | 5/2020 | Fridman et al. |
| 10,832,418 B1 * | 11/2020 | Karasev ................. G06T 7/579 |
| 11,910,089 B2 * | 2/2024 | Azoulai .................... G06T 5/80 |
| 2002/0005902 A1 | 1/2002 | Yuen |
| 2002/0030163 A1 | 3/2002 | Zhang |
| 2002/0054214 A1 | 5/2002 | Yoshikawa |
| 2002/0063711 A1 | 5/2002 | Park et al. |
| 2002/0075258 A1 | 6/2002 | Park et al. |
| 2002/0122113 A1 | 9/2002 | Foote |
| 2002/0136554 A1 | 9/2002 | Nomura et al. |
| 2002/0167741 A1 | 11/2002 | Koiwai et al. |
| 2002/0180759 A1 * | 12/2002 | Park ..................... H04N 9/8227 |
| | | 348/E7.086 |
| 2003/0030729 A1 | 2/2003 | Prentice et al. |
| 2003/0093805 A1 | 5/2003 | Gin |
| 2003/0156751 A1 | 8/2003 | Lee et al. |
| 2003/0160886 A1 | 8/2003 | Misawa et al. |
| 2003/0162564 A1 | 8/2003 | Kimura et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0189849 A1 | 9/2004 | Hofer et al. |
| 2004/0227838 A1 | 11/2004 | Atarashi et al. |
| 2004/0239313 A1 | 12/2004 | Godkin |
| 2004/0240052 A1 | 12/2004 | Minefuji et al. |
| 2005/0013509 A1 | 1/2005 | Samadani |
| 2005/0046740 A1 | 3/2005 | Davis |
| 2005/0134697 A1 | 6/2005 | Mikkonen et al. |
| 2005/0141390 A1 | 6/2005 | Lee et al. |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2005/0248667 A1 | 11/2005 | Schweng et al. |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0126737 A1 | 6/2006 | Boice et al. |
| 2006/0170793 A1 | 8/2006 | Pasquarette et al. |
| 2006/0175549 A1 | 8/2006 | Miller et al. |
| 2006/0181619 A1 | 8/2006 | Liow et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0035631 A1 | 2/2007 | Ueda |
| 2007/0114990 A1 | 5/2007 | Godkin |
| 2007/0126911 A1 | 6/2007 | Nanjo |
| 2007/0127040 A1 | 6/2007 | Davidovici |
| 2007/0159344 A1 | 7/2007 | Kisacanin |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0088942 A1 | 4/2008 | Seo |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2008/0297532 A1 * | 12/2008 | Gu .......................... G09G 3/20 |
| | | 345/600 |
| 2009/0086074 A1 | 4/2009 | Li et al. |
| 2009/0102948 A1 | 4/2009 | Scherling |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0168135 A1 | 7/2009 | Yu et al. |
| 2009/0190909 A1 | 7/2009 | Mise et al. |
| 2009/0200451 A1 | 8/2009 | Conners |
| 2009/0219547 A1 | 9/2009 | Kauhanen et al. |
| 2009/0234542 A1 | 9/2009 | Orlewski |
| 2009/0252484 A1 | 10/2009 | Hasuda et al. |
| 2009/0295949 A1 | 12/2009 | Ojala |
| 2009/0295986 A1 | 12/2009 | Topliss et al. |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0134621 A1 | 6/2010 | Namkoong et al. |
| 2010/0165131 A1 | 7/2010 | Makimoto et al. |
| 2010/0196001 A1 | 8/2010 | Ryynänen et al. |
| 2010/0202068 A1 | 8/2010 | Ito |
| 2010/0238327 A1 | 9/2010 | Griffith et al. |
| 2010/0246024 A1 | 9/2010 | Aoki et al. |
| 2010/0259836 A1 | 10/2010 | Kang et al. |
| 2010/0265331 A1 | 10/2010 | Tanaka |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0121666 A1 | 5/2011 | Park et al. |
| 2011/0128288 A1 | 6/2011 | Petrou et al. |
| 2011/0164172 A1 | 7/2011 | Shintani et al. |
| 2011/0221599 A1 | 9/2011 | Högasten |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0285714 A1 | 11/2011 | Swic et al. |
| 2011/0298966 A1 | 12/2011 | Kirschstein et al. |
| 2011/0310219 A1 | 12/2011 | Kim et al. |
| 2012/0014682 A1 | 1/2012 | David et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0098927 A1 | 4/2012 | Sablak et al. |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |

(56) References Cited

U.S. PATENT DOCUMENTS

| | | |
|---|---|---|
| 2013/0113894 A1 | 5/2013 | Mirlay |
| 2013/0135445 A1 | 5/2013 | Dahi et al. |
| 2013/0148215 A1 | 6/2013 | Mori et al. |
| 2013/0148854 A1 | 6/2013 | Wang et al. |
| 2013/0155176 A1 | 6/2013 | Paripally et al. |
| 2013/0163085 A1 | 6/2013 | Lim et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0229544 A1 | 9/2013 | Bando |
| 2013/0235224 A1 | 9/2013 | Park et al. |
| 2013/0250150 A1 | 9/2013 | Malone et al. |
| 2013/0258044 A1 | 10/2013 | Betts-Lacroix |
| 2013/0258048 A1 | 10/2013 | Wang et al. |
| 2013/0270419 A1 | 10/2013 | Singh et al. |
| 2013/0278785 A1 | 10/2013 | Nomura et al. |
| 2013/0286221 A1* | 10/2013 | Shechtman ............... G06T 7/80 |
| | | 348/187 |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0160311 A1 | 6/2014 | Hwang et al. |
| 2014/0192224 A1 | 7/2014 | Laroia |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2014/0376090 A1 | 12/2014 | Terajima |
| 2014/0379103 A1 | 12/2014 | Ishikawa et al. |
| 2015/0002683 A1 | 1/2015 | Hu et al. |
| 2015/0002684 A1 | 1/2015 | Kuchiki |
| 2015/0042870 A1 | 2/2015 | Chan et al. |
| 2015/0070781 A1 | 3/2015 | Cheng et al. |
| 2015/0086127 A1 | 3/2015 | Camilus et al. |
| 2015/0092066 A1 | 4/2015 | Geiss et al. |
| 2015/0103147 A1 | 4/2015 | Ho et al. |
| 2015/0110345 A1 | 4/2015 | Weichselbaum |
| 2015/0124059 A1 | 5/2015 | Georgiev et al. |
| 2015/0138381 A1 | 5/2015 | Ahn |
| 2015/0145965 A1 | 5/2015 | Livyatan et al. |
| 2015/0154776 A1 | 6/2015 | Zhang et al. |
| 2015/0162048 A1 | 6/2015 | Hirata et al. |
| 2015/0181115 A1 | 6/2015 | Mashiah |
| 2015/0195458 A1 | 7/2015 | Nakayama et al. |
| 2015/0198464 A1 | 7/2015 | El Alami |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0288865 A1 | 10/2015 | Osborne |
| 2015/0296112 A1 | 10/2015 | Park et al. |
| 2015/0316744 A1 | 11/2015 | Chen |
| 2015/0334309 A1 | 11/2015 | Peng et al. |
| 2016/0028949 A1 | 1/2016 | Lee et al. |
| 2016/0044250 A1 | 2/2016 | Shabtay et al. |
| 2016/0070088 A1 | 3/2016 | Koguchi |
| 2016/0154066 A1 | 6/2016 | Hioka et al. |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0238834 A1 | 8/2016 | Erlich et al. |
| 2016/0241751 A1 | 8/2016 | Park |
| 2016/0245669 A1 | 8/2016 | Nomura |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0301868 A1 | 10/2016 | Acharya et al. |
| 2016/0342095 A1 | 11/2016 | Bieling et al. |
| 2016/0353008 A1 | 12/2016 | Osborne |
| 2016/0353012 A1 | 12/2016 | Kao et al. |
| 2016/0381289 A1 | 12/2016 | Kim et al. |
| 2017/0001577 A1 | 1/2017 | Seagraves et al. |
| 2017/0019616 A1 | 1/2017 | Zhu et al. |
| 2017/0070731 A1 | 3/2017 | Darling et al. |
| 2017/0094187 A1 | 3/2017 | Sharma et al. |
| 2017/0115466 A1 | 4/2017 | Murakami et al. |
| 2017/0124987 A1 | 5/2017 | Kim et al. |
| 2017/0150061 A1 | 5/2017 | Shabtay et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0219749 A1 | 8/2017 | Hou et al. |
| 2017/0242225 A1 | 8/2017 | Fiske |
| 2017/0276954 A1 | 9/2017 | Bajorins et al. |
| 2017/0289458 A1 | 10/2017 | Song et al. |
| 2017/0294002 A1* | 10/2017 | Jia ............................. G06T 7/80 |
| 2017/0329111 A1 | 11/2017 | Hu et al. |
| 2018/0003925 A1 | 1/2018 | Shmunk |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0109660 A1 | 4/2018 | Yoon et al. |
| 2018/0109710 A1 | 4/2018 | Lee et al. |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0183982 A1 | 6/2018 | Lee et al. |
| 2018/0184010 A1 | 6/2018 | Cohen et al. |
| 2018/0198897 A1 | 7/2018 | Tang et al. |
| 2018/0216925 A1 | 8/2018 | Yasuda et al. |
| 2018/0241922 A1 | 8/2018 | Baldwin et al. |
| 2018/0249090 A1 | 8/2018 | Nakagawa et al. |
| 2018/0295292 A1 | 10/2018 | Lee et al. |
| 2018/0300901 A1 | 10/2018 | Wakai et al. |
| 2018/0307005 A1 | 10/2018 | Price et al. |
| 2018/0329281 A1 | 11/2018 | Ye |
| 2018/0368656 A1 | 12/2018 | Austin et al. |
| 2019/0089941 A1 | 3/2019 | Bigioi et al. |
| 2019/0096047 A1 | 3/2019 | Ogasawara |
| 2019/0100156 A1 | 4/2019 | Chung et al. |
| 2019/0121103 A1 | 4/2019 | Bachar et al. |
| 2019/0121216 A1* | 4/2019 | Shabtay ................. H04N 23/45 |
| 2019/0130822 A1 | 5/2019 | Jung et al. |
| 2019/0154466 A1 | 5/2019 | Fletcher |
| 2019/0213712 A1 | 7/2019 | Lashdan et al. |
| 2019/0215440 A1 | 7/2019 | Rivard et al. |
| 2019/0222758 A1 | 7/2019 | Goldenberg et al. |
| 2019/0227338 A1 | 7/2019 | Bachar et al. |
| 2019/0228562 A1 | 7/2019 | Song |
| 2019/0297238 A1 | 9/2019 | Klosterman |
| 2019/0320119 A1 | 10/2019 | Miyoshi |
| 2019/0394396 A1* | 12/2019 | Fridman ................. H04N 23/55 |
| 2020/0014912 A1 | 1/2020 | Kytsun et al. |
| 2020/0092486 A1 | 3/2020 | Guo et al. |
| 2020/0103726 A1 | 4/2020 | Shabtay et al. |
| 2020/0104034 A1 | 4/2020 | Lee et al. |
| 2020/0118287 A1 | 4/2020 | Hsieh et al. |
| 2020/0134848 A1 | 4/2020 | El-Khamy et al. |
| 2020/0162682 A1 | 5/2020 | Cheng et al. |
| 2020/0221026 A1 | 7/2020 | Fridman et al. |
| 2020/0264403 A1 | 8/2020 | Bachar et al. |
| 2020/0389580 A1 | 12/2020 | Kodama et al. |
| 2021/0048605 A1* | 2/2021 | Lim ...................... H04N 23/55 |
| 2021/0180989 A1 | 6/2021 | Fukumura et al. |
| 2021/0208415 A1 | 7/2021 | Goldenberg et al. |
| 2021/0333521 A9 | 10/2021 | Yedid et al. |
| 2021/0368104 A1 | 11/2021 | Bian et al. |
| 2022/0252963 A1 | 8/2022 | Shabtay et al. |
| 2022/0368814 A1 | 11/2022 | Topliss et al. |
| 2023/0108086 A1* | 4/2023 | Azoulai ............... H04N 23/683 |
| | | 348/208.6 |

(56)         References Cited

U.S. PATENT DOCUMENTS

FOREIGN PATENT DOCUMENTS

| CN | 102130567 A | 7/2011 |
| CN | 102215373 A | 10/2011 |
| CN | 102739949 A | 10/2012 |
| CN | 102982518 A | 3/2013 |
| CN | 103024272 A | 4/2013 |
| CN | 203406908 U | 1/2014 |
| CN | 203482298 U | 3/2014 |
| CN | 103841404 A | 6/2014 |
| CN | 204422947 U | 6/2015 |
| CN | 205301703 U | 6/2016 |
| CN | 105827903 A | 8/2016 |
| CN | 105847662 A | 8/2016 |
| CN | 107608052 A | 1/2018 |
| CN | 107682489 A | 2/2018 |
| CN | 109729266 A | 5/2019 |
| EP | 1536633 A1 | 6/2005 |
| EP | 1780567 A1 | 5/2007 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2002010276 A | 1/2002 |
| JP | 2003298920 A | 10/2003 |
| JP | 2003304024 A | 10/2003 |
| JP | 2004056779 A | 2/2004 |
| JP | 2004133054 A | 4/2004 |
| JP | 2004245982 A | 9/2004 |
| JP | 2005099265 A | 4/2005 |
| JP | 2005122084 A | 5/2005 |
| JP | 2005321592 A | 11/2005 |
| JP | 2006038891 A | 2/2006 |
| JP | 2006191411 A | 7/2006 |
| JP | 2006237914 A | 9/2006 |
| JP | 2006238325 A | 9/2006 |
| JP | 2008083377 A | 9/2006 |
| JP | 2007086808 A | 4/2007 |
| JP | 2007228006 A | 9/2007 |
| JP | 2007306282 A | 11/2007 |
| JP | 2008076485 A | 4/2008 |
| JP | 2008245142 A | 10/2008 |
| JP | 2008271026 A | 11/2008 |
| JP | 2010204341 A | 9/2010 |
| JP | 2011055246 A | 3/2011 |
| JP | 2011085666 A | 4/2011 |
| JP | 2011138407 A | 7/2011 |
| JP | 2011203283 A | 10/2011 |
| JP | 2012132739 A | 7/2012 |
| JP | 2013101213 A | 5/2013 |
| JP | 2013106289 A | 5/2013 |
| JP | 2016105577 A | 6/2016 |
| JP | 2017146440 A | 8/2017 |
| JP | 2019126179 A | 7/2019 |
| KR | 20070005946 A | 1/2007 |
| KR | 20090058229 A | 6/2009 |
| KR | 20100008936 A | 1/2010 |
| KR | 20110080590 A | 7/2011 |
| KR | 20110082494 A | 7/2011 |
| KR | 20130104764 A | 9/2013 |
| KR | 1020130135805 A | 11/2013 |
| KR | 20140014787 A | 2/2014 |
| KR | 101428042 B1 | 8/2014 |
| KR | 101477178 B1 | 12/2014 |
| KR | 20140144126 A | 12/2014 |
| KR | 20150118012 A | 10/2015 |
| KR | 20170105236 A | 9/2017 |
| KR | 20180120894 A | 11/2018 |
| KR | 20130085116 A | 6/2019 |
| KR | 1020200005332 A | 1/2020 |
| TW | I407177 B | 9/2013 |
| WO | 2000027131 A2 | 5/2000 |
| WO | 2004084542 A1 | 9/2004 |
| WO | 2006008805 A1 | 1/2006 |
| WO | 2010122841 A1 | 10/2010 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

Statistical Modeling and Performance Characterization of a Real-Time Dual Camera Surveillance System, Greienhagen et al., Publisher: IEEE, 2000, 8 pages.
A 3MPixel Multi-Aperture Image Sensor with 0.7μm Pixels in 0.11μm CMOS, Fife et al., Stanford University, 2008, 3 pages.
Dual camera intelligent sensor for high definition 360 degrees surveillance, Scotti et al., Publisher: IET, May 9, 2000, 8 pages.
Dual-sensor foveated imaging system, Hua et al., Publisher: Optical Society of America, Jan. 14, 2008, 11 pages.
Defocus Video Matting, McGuire et al., Publisher: ACM SIGGRAPH, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 2007, 9 pages.
Superimposed multi-resolution imaging, Carles et al., Publisher: Optical Society of America, 2017, 13 pages.
Viewfinder Alignment, Adams et al., Publisher: Eurographics, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.
Office Action in related KR patent application 2022-7043019, dated Sep. 2, 2024.
Extended Search Report in related EP patent application 25155993, dated May 16, 2025.
Tian Dapeng et al: "Long Integral Time Continuous Panorama Scanning Imaging Based on Bilateral Control with Image Motion Compensation", Remote Sensing (Basel, Switzerland), vol. 11, No. 16, Aug. 17, 2019, p. 1924, XP093273399, Basel, ISSN: 2072-4292, DOI: 10.3390/rs11161924.

* cited by examiner

| Provide calibration chart 502 | Direct to POV 504 | Tele image capture 506 | Analyze Tele images 508 | Derive calibration data 510 | Apply calibration data 512 |

600

1

POINT OF VIEW ABERRATIONS CORRECTION IN A SCANNING FOLDED CAMERA

CROSS REFERENCE TO RELATED APPLICATIONS

This is a continuation of U.S. patent application Ser. No. 18/064,269 filed Dec. 11, 2022, (now allowed), which was a continuation application of U.S. patent application Ser. No. 17/633,204 filed Feb. 6, 2022 (issued as U.S. Pat. No. 11,910,089), which was a 371 application from international application PCT/IB2021/056311 filed Jul. 13, 2021, and is related to and claims priority from U.S. Provisional Patent Application No. 63/051,993 filed Jul. 15, 2020, which is incorporated herein by reference in its entirety.

FIELD

Embodiments disclosed herein relate in general to digital cameras and in particular to correction of images obtained with folded digital cameras.

BACKGROUND

Compact digital cameras having folded optics, also referred to as "folded cameras" or "folded camera modules" are known, see e.g. co-owned international patent application PCT/IB2016/057366. FIG. 1A shows schematically a folded Tele camera disclosed therein and numbered 100 from a first perspective view. FIG. 1B shows camera 100 from a second perspective view. Camera 100 includes a lens 102 with a lens optical axis 110, an optical path folding element (OPFE) 104 and an image sensor 106. OPFE 104 folds a first optical path which defines the point of view (POV) 108 of camera 100 and which is substantially parallel to the X axis from an object, scene or panoramic view section 114 into a second optical path along an axis 110 substantially parallel to the Z axis. Image sensor 106 has a plane normal aligned with (parallel to) axis 110 and outputs an output image that may be processed by an image signal processor (ISP—not shown). In some embodiments, the ISP may be part of image sensor 106.

Camera 100 is designed to rotate OPFE 104 around axis 110 (the Z axis) relative to the image sensor, a rotation indicated by an arrow 112. That is, camera 100 is a "scanning" Tele camera ("STC"). OPFE 104 can rotate in an angle range as required by optical requirements (see below), in some cases by up to 180 degrees and in other cases by up to 360 degrees. Camera 100 can scan a scene with its "native" Tele field of view ("N-FOV$_T$"), so that it effectively covers a FOV of a scene which is larger than N-FOV$_T$ and which we call scanning Tele FOV ("S-FOV$_T$"). S-FOV$_T$ is the FOV that includes all scene segments that can be captured with the STC in a plurality of STC images. For scanning a scene in 2 dimensions, OPFE 104 must be rotated around two rotation axes. For example, N-FOV$_T$=10-20 deg and S-FOV$_T$=30-80 deg.

FIG. 1C shows OPFE 104 after rotation by 30 degrees and FIG. 1D shows OPFE 104 after rotation by 180 degrees from the zero position. The 30 and 180 degree rotated positions are exemplary of a range of many rotation positions.

Images are acquired from a certain point of view (POV) of the camera. The POV is the direction defined by the unit vector of the vector that has the location of the camera aperture as starting point and an object point at the center of N-FOV$_T$ as end point. As an example, in spherical coordinates (r, θ, φ) defined according to ISO convention, the POV for a camera at r=0 is defined by (1, θ, φ), with the polar angle θ and azimuthal angle φ defining the location of the object point at C-N-FOV$_T$. In FIGS. 1A and 1B, the OPFE is in a zero rotation position ("zero position"). With the OPFE in a zero position, an image acquired with the sensor (i.e. "produced" by camera 100) has no POV aberrations. In spherical coordinates defined as see above, the zero rotation position is given by (1, 0, 0). When the POV changes, the image acquired by the sensor undergoes POV aberrations. Specifically, an image may be tilted (stretched to a trapeze shape) and/or rotated and/or scaled, see e.g. FIGS. 2A and 2B.

There is a need for and it would be advantageous to have a STC image without POV aberrations regardless of the POV.

SUMMARY

Considering the OPFE position, a method suggested herein uses a digital algorithm to correct the POV aberration to obtain an image without POV aberrations. After acquiring (capturing) an image and correcting it, it is suggested herein to crop a rectangular area from the corrected image, to display a cropped rectangular image on the screen or save the cropped rectangular image to a file. For each OPFE position, a pre-calculated geometric transformation (i.e. homography transform) is applied on the acquired image, resulting in a POV aberration-corrected image.

Depending on the OPFE position after correcting the POV aberration, the original (uncorrected) image center will not coincide with the corrected image center. There may be for example five different cropping options (A, B, C, D, E), see FIG. 3D.

The outcome of the cropping is a rectangular image with the same aspect ratio AR (i.e. height/width=3/4) as the zero position, but with a smaller image area than for the zero-position image area. The size of the image area depends on the OPFE position. The corrected and cropped image is scaled to fit the display size or the saved image size.

All images may be further cropped to have the same crop size (image area) for all OPFE positions. The maximal crop size that fits all OPFE positions can be calculated as the minimal size from the set of maximum sizes for every OPFE position.

In various embodiments there are provided methods, comprising: providing a Tele folded camera that includes an OPFE and an image sensor; tilting the OPFE in one or more directions to direct the Tele folded camera towards a POV; capturing a Tele image or a stream of Tele images from the POV, the Tele image having a POV aberration; and digitally correcting the POV aberration.

Is some embodiments, the POV may have a plurality of aberrations and the above and below apply to the correction of one, some, or all of the plurality of aberrations.

In some embodiments, the correcting the POV aberration includes applying a geometric transformation to the captured Tele image to obtain a respective aberration-corrected image. In some exemplary embodiments, the geometric transformation uses calibration information captured during a camera calibration process.

In some embodiments, a method further comprises cropping the aberration-corrected image to obtain an aberration-corrected cropped (ACC) image that has an ACC image center, an ACC image size and an ACC image width/height ratio.

In some embodiments, a method further comprises scaling the ACC image to obtain an aberration-corrected cropped and scaled output image that has an output image center (OIC), an output image size and an output image width/height ratio. In some embodiments, the tilting of the OPFE and the capturing of a Tele image from the POV are repeated to obtain a plurality of Tele images captured at a plurality of POVs, and the OIC is selected such that a plurality of Tele images captured for all possible POVs cover a maximum rectangular area within a scene. In some embodiments, the tilting of the OPFE and the capturing of a Tele image from the POV are repeated to obtain a plurality of Tele images captured at a plurality of POVs, and the OIC is selected such that a plurality of Tele images captured for a particular plurality of POVs cover a maximum rectangular area within a scene.

In various embodiments there are provided systems, comprising: a Wide camera with a Wide field of view $FOV_W$; a Tele folded camera with a Tele field of view $FOV_T < FOV_W$ and which includes an OPFE and an image sensor, the Tele camera having a scanning capability enabled by OPFE tilt in one or more directions to direct the Tele folded camera towards a POV of a scene and used to capture a Tele image or a stream of Tele images from the POV, the Tele image or stream of Tele images having a POV aberration; and a processor configured to digitally correct the POV aberration.

In some embodiments, the POV aberration may be corrected using calibration data.

In some embodiments, the calibration data may be stored in a non-volatile memory.

In some embodiments, the calibration data include data on calibration between tilt positions of the OPFE in one or two directions and corresponding POVs.

In some embodiments, the calibration data may include data on calibration between a Tele image and a Wide image.

In some embodiments, the calibration data may include data on calibration between tilt positions of the OPFE in one or two directions and the position of $FOV_T$ within $FOV_W$.

In some embodiments, the processor configuration to digitally correct the POV aberration may include applying a configuration to apply a geometric transformation to the captured Tele image or stream of Tele images to obtain an aberration-corrected image.

In some embodiments, the geometric transformation may be a homography transformation.

In some embodiments, the geometric transformation may include a homography motion-based calculation using a stream of frames from the Wide camera.

In some embodiments, the homography motion-based calculation may further use inertial measurement unit information.

In some embodiments, the geometric transformation may be a non-affine transformation.

In some embodiments, the image sensor has an image sensor center, an active sensor width and an active sensor height, and the OIC coincides with the image sensor center.

In some embodiments, the OIC may be selected such that a largest possible rectangular crop image size for a particular output image width/height ratio is achieved.

In some embodiments, the OIC may be located less than a distance of 10× pixel size away from an ideal OIC.

In some embodiments, the OIC may be located less than a distance of 10% of the active sensor width away from an ideal OIC.

In some embodiments, the OIC may be located less than a distance of 10% of the active sensor height away from an ideal OIC.

In some embodiments, the OIC may be selected such that an object-image magnification M of an object across different POVs does vary from a constant value by less than 10%

In some embodiments, the OIC may be selected such that the output image covers a maximum area within a scene.

In some embodiments, the OIC may be selected such that a plurality of Tele images captured for all possible POVs cover a maximum rectangular area within the scene.

In some embodiments, the OIC may be selected such that a plurality of Tele images captured for a particular plurality of POVs cover a maximum rectangular area within the scene.

In some embodiments, the OIC may be selected such that the output image shows a region of interest or object of interest in a visually appealing fashion.

In various embodiments there are provided methods, comprising: providing a Tele folded camera that includes an OPFE and an image sensor; tilting the OPFE in one or more directions to direct the Tele folded camera towards a POVs of a calibration chart, each POV associated with a respective OPFE position; capturing a respective Tele image of the calibration chart at each POV, each Tele image having a respective POV aberration; analyzing the Tele image data for deriving calibration data between each POV with its respective POV aberration and the respective OPFE position; and using the calibration data to digitally correct the POV aberration.

In some embodiments, the calibration chart may include location identifiers that allow to determine the POV for the given OPFE position from the respective Tele image.

In some embodiments, the calibration chart may include angular identifiers that allow to determine the POV aberration for the given OPFE position from each Tele image.

In some embodiments, the calibration chart may be a checkerboard chart.

In some embodiments, the calibration data chart may represented by a bi-directional function that translates any OPFE position to a Tele POV and/or its respective POV aberrations and vice versa.

In some embodiments, the bi-directional function chart may a polynomial.

In some embodiments, the calibration data chart may represented by a bi-directional Look-Up-Table that translates any OPFE position to a Tele POV and/or its respective POV aberrations and vice versa.

In some embodiments, the calibration data chart may represented by a Look-Up-Table comprising a plurality of OPFE positions with associated values for Tele POVs and/or its respective POV aberrations.

In some embodiments, the plurality of OPFE positions may include more than five OPFE positions, more than 50 OPFE positions, or even more than 250 OPFE positions.

In some embodiments, a method may further comprise providing a Wide camera with a field of view $FOV_W$ larger than a field of view $FOV_T$ of the Tele folded camera.

In some embodiments, between the analyzing of the Tele image and the using of the calibration data, a method may further comprise: in a first additional step, with a Tele image POV positioned within a respective Wide image FOV at a respective OPFE position associated with the Tele image POV, capturing an additional Tele image of the calibration chart along with capturing a Wide image of the calibration chart, and in a second additional step, using the Tele and Wide image data for deriving calibration data between the respective OPFE position, the Tele POV within the respective Wide FOV and the Tele image's POV aberration with respect to the Wide image. In some such embodiments, the first and second additional steps may be performed simultaneously. In some such embodiments, all the steps may be performed by a same operator. In some such embodiments, the first four steps may be performed by a first operator, and the first and second additional steps may be performed by a second operator. In some such embodiments, the first four steps may be performed in a time frame of less than 10 s, and the first and second additional steps are performed in a time frame of less than 10 s. In some such embodiments, the first four steps may performed in a time frame of less than 5 s and the first and second additional steps are performed in a time frame of less than 5 s. In some such embodiments, the first additional step does not include any additional image capture, and the analysis and the deriving of the calibration data may include receiving external calibration data between the Tele folded camera and the Wide camera.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated like numerals.

DETAILED DESCRIPTION

Figure 1A:
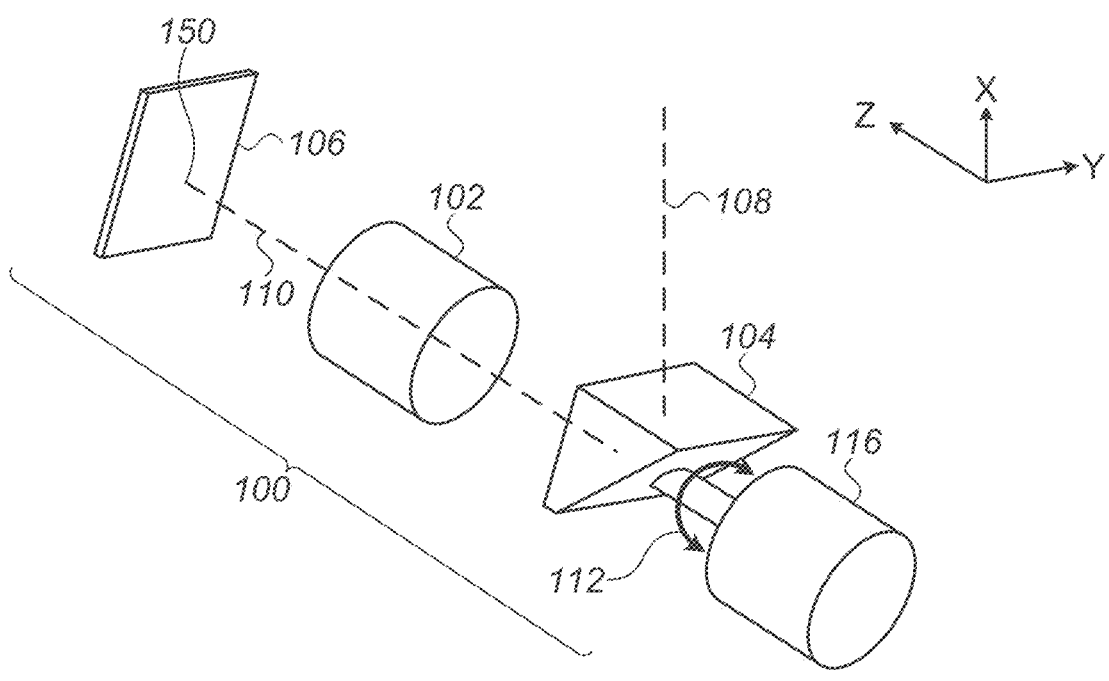
FIG. 1A shows schematically a known folded camera with an OPFE in zero position from one perspective view.
Figure 1B:
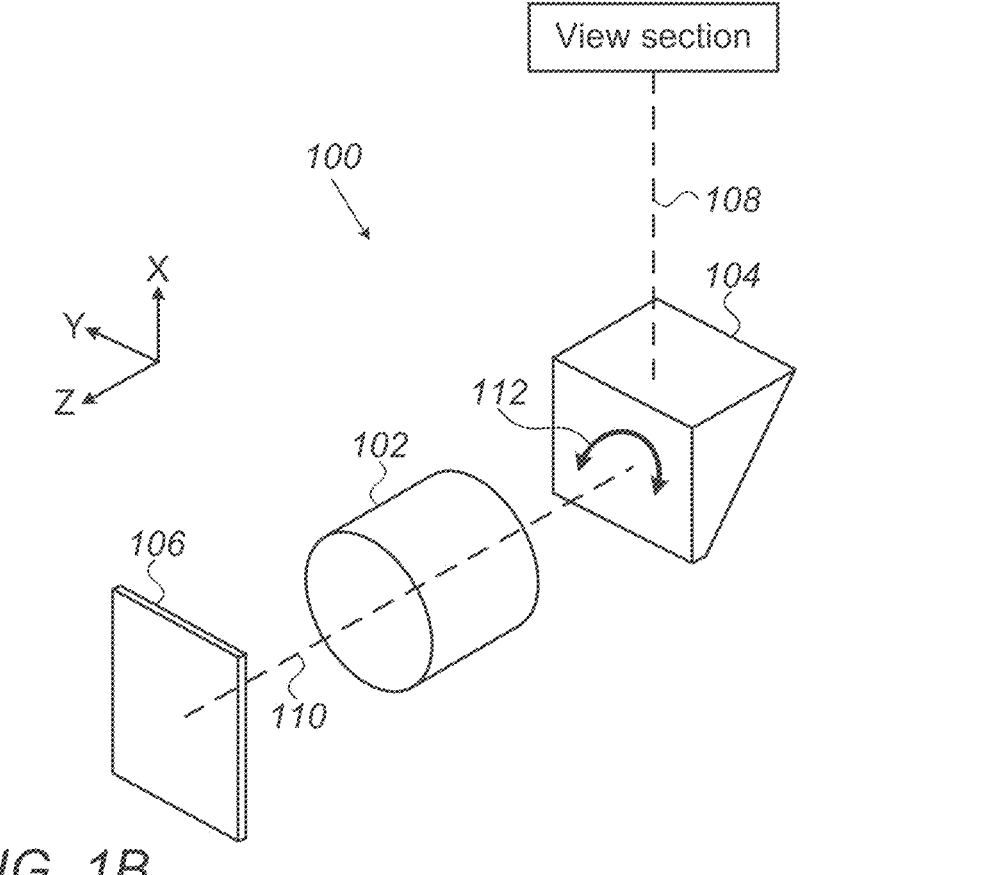
FIG. 1B shows schematically the folded camera of FIG. 1A from another perspective view.
Figures 1C, 1D:
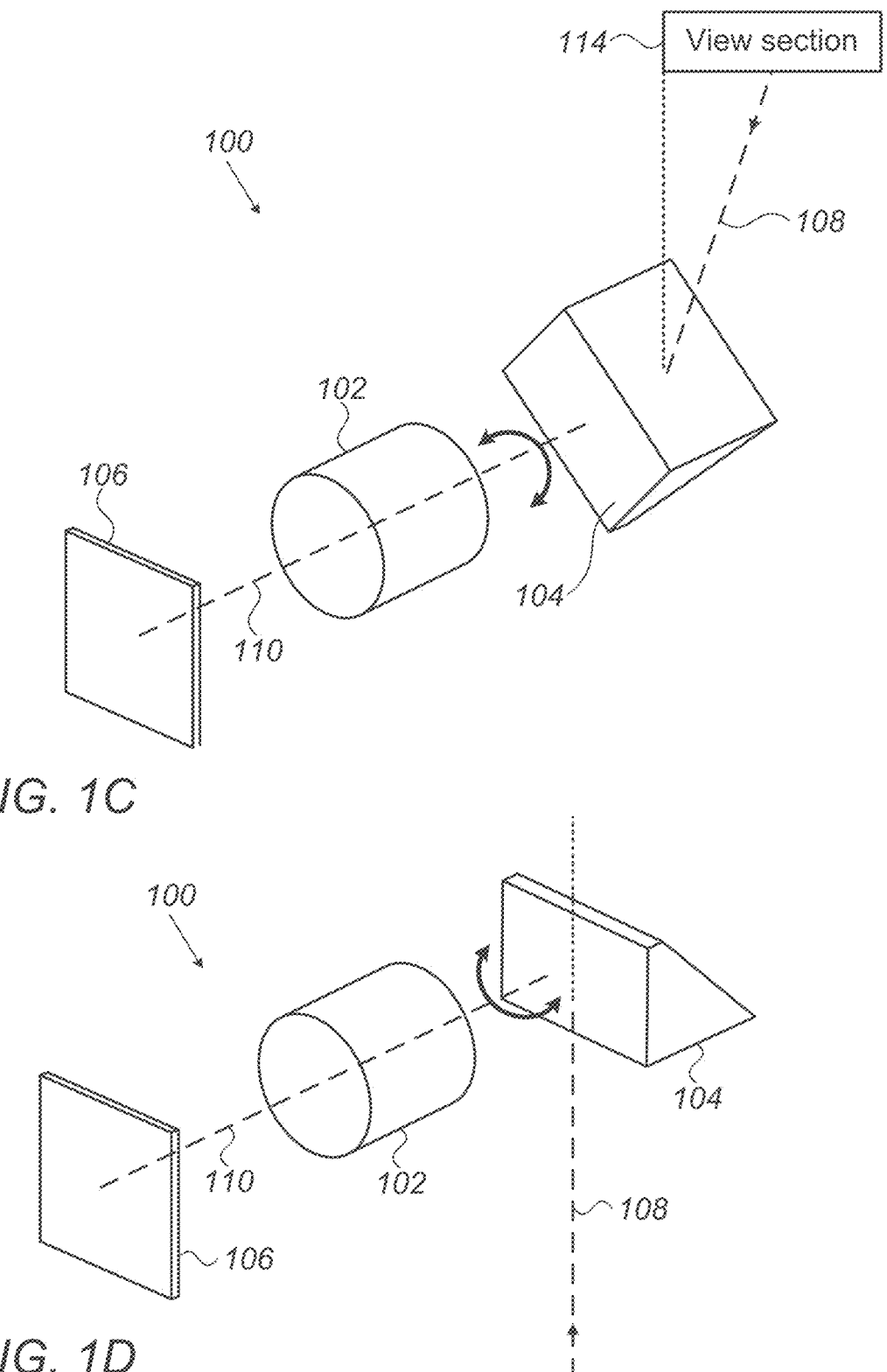
FIG. 1C shows schematically the camera of FIG. 1A with the OPFE in a first non-zero position.
FIG. 1D shows schematically the camera of FIG. 1A with the OPFE in a second non-zero position.
Figure 2A:
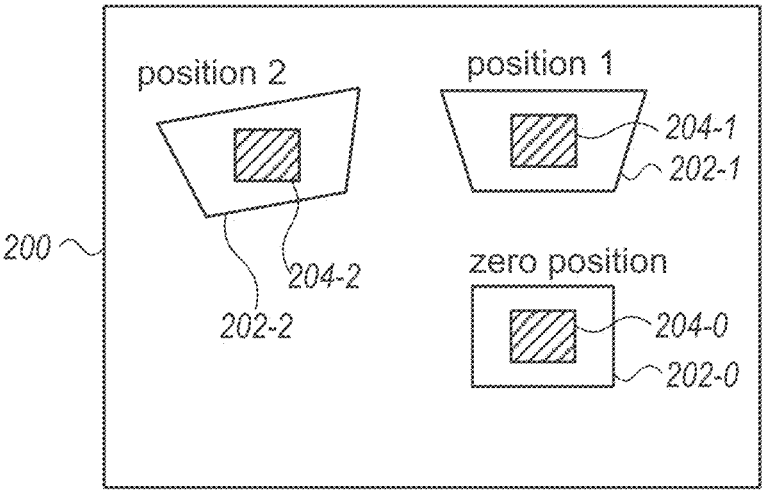
FIG. 2A shows different OPFE positions and respective FOVs in an object domain.
Figures 2B, 2C:
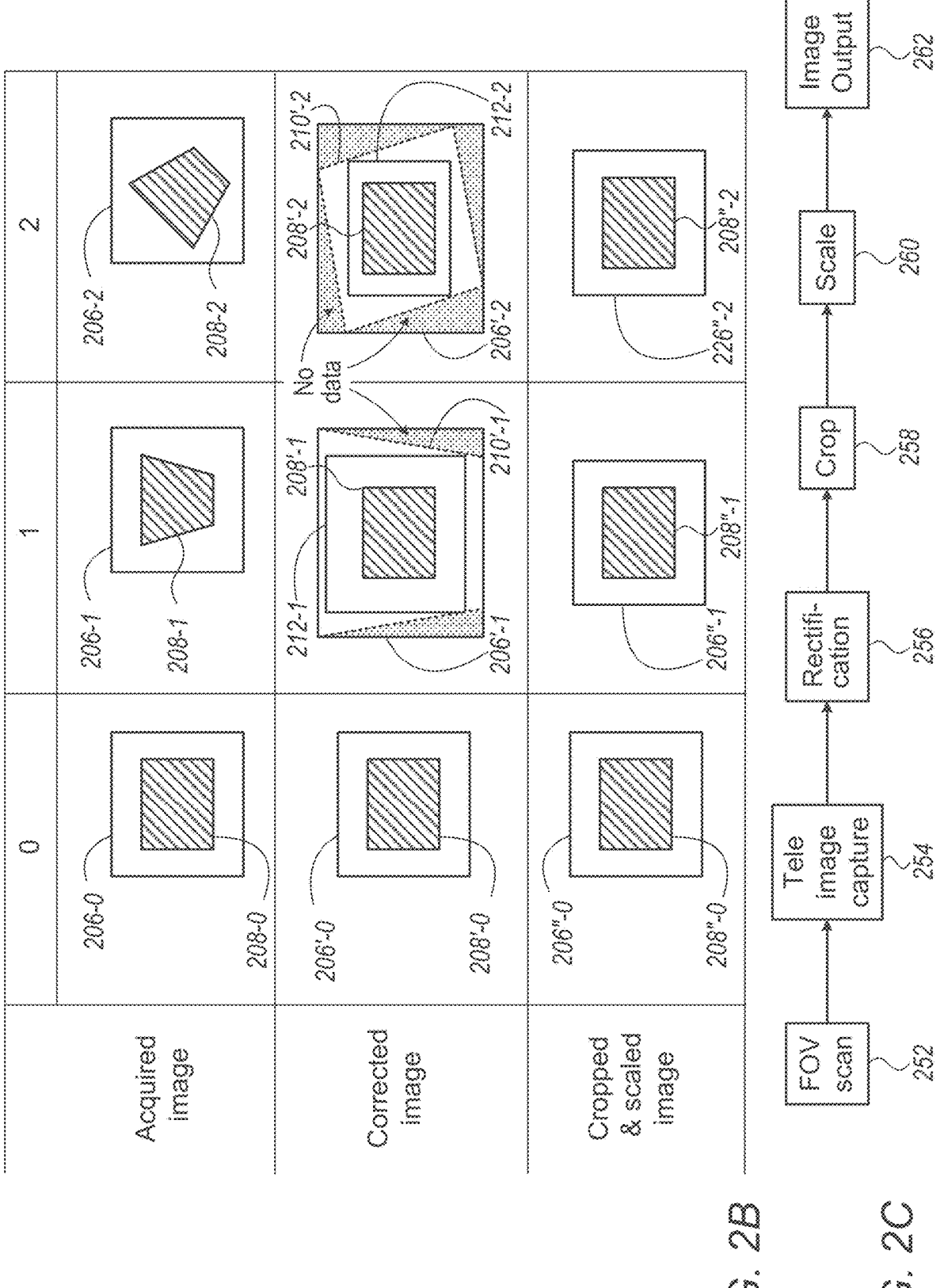
FIG. 2B shows acquired images, corrected images and cropped images of respective objects at the three different OPFE positions.
FIG. 2C shows the method for generating a Tele output image as described herein.

FIG. 2A shows different OPFE positions and their respective N-FOV$_T$ s in an "object domain". FIG. 2B shows acquired images, corrected images and cropped images of respective objects at the three different (0, 1 and 2) OPFE positions shown in FIG. 2A. The object domain is defined as the appearance of a scene that is captured by an ideal camera having a sufficiently large FOV and not having any aberrations and distortions. That is, the object domain corresponds to the appearance of the scene as it may appear to a human observer. The object domain is differentiated from an "image domain", which is defined as the appearance of the scene as captured by a STC such as camera 100.

In FIGS. 2A-B, 202-$i$ ($i$=0, 1, 2) represent S-FOV$_T$a, 204-$i$ represent objects, 206-$i$ represent image frames, 208-$i$ represent images of objects 204-$i$, 210-$i$ represent image data boundaries and 212-$i$ represent rectangular crops of image frames.

Box 200 represents the smallest rectangular FOV that includes S-FOV$_T$, i.e. all the image data from all POVs that can be reached with a STC in the object domain. The N-FOV$_T$s for three different OPFE positions (0, 1 and 2) are represented by 202-0, 202-1 and 202-2. Each OPFE position corresponds to a different POV. The N-FOV$_T$ for an OPFE "zero position" 202-0 is defined as an N-FOV$_T$ that produces an image of an object or scene without POV aberrations, i.e. (besides a scaling factor and assuming no camera aberrations and distortions) at zero position an object in the object domain is identical to the object image in the image domain. As shown, the N-FOV$_T$ at any other position (e.g. 202-1 and 202-2) is not a horizontal rectangle (with respect to 202-0), but an arbitrary tetragon. The same rectangular object is represented by 204-0, 204-1 and 204-2 in, respectively, N-FOV$_T$ S 202-0, 202-1 and 202-2.

In an example, the OPFE is positioned at a scanning position 1 (FIG. 2A) with N-FOV$_T$ 202-1 that includes object 204-1 and represents a POV of the STC. An image frame 206-1 (FIG. 2B) is captured (acquired) at position 1. In the captured image, object 204-1 is represented by captured object image 208-1 (FIG. 2B). A geometric transformation is applied on frame 206-1 to obtain a corrected image frame 206'-1. The geometric transformation is related to the rotation angle of the OPFE under which the respective image was captured. Inside corrected image frame 206'-1, one can see the corrected image 208'-1 of image 208-1. 210'-1 marks the boundary of image data present in corrected image frame 206'-1, and 212-1 is a possible rectangular crop comprising an image segment of 210'-1. Rectangular crop 212-1 may have the same aspect ratio AR (i.e. a ratio of horizontal width and vertical height) as AR of image sensor 106. In other examples, rectangular crop 212-1 may have a same aspect ratio as the aspect ratio used for outputting a zero position image such as 206"-0. Corrected image 206'-1 is then cropped to obtain a corrected cropped image 206"-1.

In FIG. 2B in the acquired image row, 206-0, 206-1 and 206-2 are original raw image captures (frames) acquired at, respectively, OPFE positions 0, 1 and 2. 208-0, 208-1 and 208-2 are captured images of, respectively, objects 204-0, 204-1 and 204-2. In the corrected image row, 206'-0, 206'-1 and 206'-2 represent corrected (also referred to as "rectified" or "aberration-corrected") image frames that underwent image rectification. 208'-0, 208'-1 and 208'-2 represent captured object images 208-0, 208-1 and 208-2 of objects 204-0, 204-1 and 204-2 after image rectification, i.e. they represent "corrected images" (or "rectified images") of the objects. The image data present in corrected image 206'-1 has a boundary 210'-1 and the image data in corrected image 206'-2 has a boundary 210'-2. The dotted area between 206'-1 and 210'-1, and between 206'-2 and 210'-2 has no valid image data to be shown on screen or saved to disk (i.e. the area includes only empty pixels). 212-1 and 212-2 are possible rectangular crops comprising image segments of 210'-1 and 210'-2 respectively. 212-1 and 212-2 may have a specific AR. In the cropped image row, 206"-0, 206"-1 and 206"-2 are aberration-corrected cropped ("ACC") images comprising image data of 206'-0, 206'-1 and 206'-2, i.e. they comprise corrected image data of 206-0, 206-1 and 206-2. In some embodiments, after cropping the images are scaled. In images 206"-0, 206"-1 and 206"-2, areas 208"-0, 208"-1 and 208"-2 represent the image data of objects 204-0, 204-1 and 204-2 which underwent rectification, cropping and scaling. The images 206"-1 and 206"-2 are generated by cropping images 206'-1 and 206'-2 along the boundaries 212-1 and 212-2 respectively. Image 206"-0 did not undergo cropping, i.e. all image data of 206'-0 is present also in 206"-0. Note that since position 'O' was defined as having no POV aberrations, the correction algorithm will have no effect on the acquired image (i.e. 206-0, 206'-0 and 206"-0 will be identical). In other examples, 206-0, 206'-0 and 206"-0 may not be of equal size, but 206'-0 and/or 206"-0 may differ in size from 206-0 by a certain crop factor. The same applies for object images 208-0, 208'-0 and 208"-0.

FIG. 2C shows schematically an exemplary method for generating a Tele output image disclosed herein. In a first step 252, a command triggered by a human user or a program directs N-FOV$_T$ to a region of interest (ROI) within a scene by scanning. The scanning may be performed by rotating an OPFE. The FOV scanning by OPFE rotation is not performed instantaneously, but requires some settling time, which may be for example about 1-30 ms for scanning 2-5 degrees and about 15-100 ms for scanning 10-25 degrees. After the settling time, an STC image (such as images 206-0, 206-1 and 206-2 in FIG. 2B) is captured in step 254. In step 256, the STC image is rectified. In a first rectification sub-step (called "geometrical transformation sub-step"), a geometric transformation (such as a homography transformation, an affine transformation or a non-affine transformation) is performed, with results as shown in FIG. 2B. In the following and as an example, "homography transformation" is used to represent any meaningful geometric transformation. The homography transformation corrects for the aberrations associated with any particular POV and is thus a function of the POV. A second rectification sub-step ("interpolation sub-step") may be performed, which is detailed below.

A corrected (or rectified, or aberration-corrected) image is thus obtained. Calibration data between an OPFE position and the corresponding POV may be used to select the homography transformation corresponding to the particular POV. In some embodiments, the geometric transformation may include corrections known in the art such as e.g. distortion correction and color correction. In step 258, the corrected image is cropped as depicted in FIG. 2B. In step 260, the cropped image is scaled. A cropped and scaled output image is output in step 262. The output image may be displayed on an electronic device such as device 400 (FIG. 4) and/or stored in a memory such as memory 450 (FIG. 4) or any other memory of the device.

The cropping in step 258 may be done according to different crop selection criteria. Some crop selection criteria may aim for a particular size of the cropped image. Other crop selection criteria may enable a particular input image coordinate to be transferred to a particular image coordinate of the cropped image. In the following, "crop selection" criteria may be referred to simply as "crop criteria".

Crop criteria that aim for a particular size of cropped images may be as follows: in one criterion (crop criterion 1), the image may be cropped so that a resulting image is a rectangular image. In another criterion (crop criterion 2), the resulting image may be a square. Here and in the following, the image size and shape are defined by the number and distribution of the image pixels, so that size and shape do not depend on the actual mode the image is displayed. As an example, a rectangular image has m rows (image height), wherein each row includes n values (image width). A square image has m rows with m values each. A first rectangular image having $m_1$ rows with $n_1$ values each is larger than a second rectangular image having $m_2$ rows and $n_2$ values if $m_1 \times n_1 > m_2 \times n_2$ is satisfied.

In yet another criterion (crop criterion 3), the image is cropped so that a largest rectangular image having a particular AR for the particular POV is obtained. Examples for this criterion are the crop options "D" and "E" shown in FIG. 3D. The AR refers to the width/height ratio of an image. An AR may e.g. be 4:3, 3:2 or 16:9. In yet another criterion (crop criterion 4), the image captured at a first POV is cropped so that the resulting image has the same AR and size as an image captured at a second POV. The second POV is the POV that leads to the smallest image obtained by cropping a largest rectangular image having a particular AR for the second POV. Crop criterion 4 ensures that cropped images at all possible POVs have identical AR and shape. In yet another criterion (crop criterion 5), the image is cropped so that all output images generated from STC images captured in step 254 from the entire S-FOV$_T$ cover a largest area of a rectangular FOV in the object domain. This cropping criterion ensures that the area of a rectangular FOV in the object domain such as 200 is covered maximally by S-FOV$_T$. In yet another criterion (crop criterion 6), the image is cropped rectangularly so that an identical object-to-image magnification is obtained for the entire S-FOV$_T$. In general, the object images of images captured in step 254 are smaller for larger POVs. In some embodiments, the condition of "identical magnification" may be satisfied if the magnifications obtained for all POVs vary from a constant value by <10%. In other examples, the condition of "identical magnification" may be satisfied if the magnifications obtained for all POVs vary by <5% or by <15%.

Crop criteria that map particular input image coordinates to particular image coordinates of the cropped image are presented next. In general, and by applying a particular crop selection criterion, any arbitrary object image point of the image captured in step 254 (the "input image") can be defined as the image center of the image output in step 262. In a crop criterion 7, the image may be cropped rectangularly so that the image center of the cropped image contains image data identical with that of the input image center for a particular POV. An image center may be defined as the center pixel and the surrounding pixels that lie within a radius of e.g. 10 times the pixel size. In some embodiments, the image center may be defined as the center pixel plus surrounding pixels that lie within a radius of e.g. 5 or 30 times the pixel size.

In a crop criterion 8, the image may be cropped rectangularly so that the cropped image center contains image data identical with that of an input image center, with the cropped image additionally fulfilling the condition that any two images that are captured at arbitrary first and second POVs are cropped so that the resulting images have the same AR and size. In yet other examples, crop criterion 8 may additionally fulfill the condition that the cropped images are of maximal size (crop criterion 9). In yet other examples, an image may be cropped so that a ROI or an object of interest (OOI) is displayed on the image output in step 264 in a visually appealing fashion (crop criterion 10). This criterion may support aesthetic image cropping, e.g. as described by Wang et al in the article "A deep network solution for attention and aesthetics aware photo cropping", May 2018, IEEE Transactions on Pattern Analysis and Machine Intelligence. Applications of aesthetic image cropping are also described in the co-owned PCT Patent Application No. PCT/IB2020-061330. In yet other examples, an image may be cropped according to the needs of further processing steps, e.g. the image may be cropped so that only a particular segment of the FOV in the object domain is included (crop criterion 11). A possible further processing may e.g. be the generation of a super image, i.e. of an output image that is composed of the image data of a plurality of input images. The generation of a super-image is described in co-owned PCT Patent Application No. PCT/IB2021-054070. Another possible further processing may be the generation of a panorama image as known in the art.

The scaling in step 260 may be performed according to different scaling selection criteria. In some embodiments, scaling may be performed so that images captured under different POVs in step 254 and output in step 262 (the "output image") have identical size and AR (scale criterion 1). In other examples, scaling may be performed so that the pixel density per object image area in the output image is identical with the pixel density per area in the object domain present in the image captured in step 254 (scale criterion 2). In yet other examples, scaling may be performed so that the image size fits the requirements of a program that performs further processing on the image data (scale criterion 3).

Steps 252-262 outlined above may be performed sequentially, i.e. one after the other.

In some STC image rectification embodiments, step 256 may be performed as follows: let $(x^{in}_i, y^{in}_j)$ be the values of some arbitrary image coordinates (i, j) of an input image (captured in step 254) and let $(x^{out}_m, y^{out}_n)$ be the values of some arbitrary image coordinates (m, n) of an output image (of step 256). In the geometrical transformation sub-step, a homography transformation may be $(x^{out}, y^{out})=f_H(x^{in}, y^{in})$ with H being a 3×3 homography transformation matrix known in the art. The homography transformation can be inversed by using $f_H^{-1}=f_{H-1}$. A crop transformation $(x^{out}, y^{out})=\text{Crop}(x^{in}, y^{in})$ may be $(x^{out}_m, y^{out}_n)=(x^{in}_i-\text{crop-start}\_x_i, y^{in}_j-\text{crop-start}\_y_j)$ for assigning each coordinate of the input image a coordinate in the output image wherein only coordinates with values>0 are used for the output image. Vector (crop-start_$x_i$, crop-start_$y_j$) defines size and shape of the cropped image. An inverse crop transformation $\text{Crop}^{-1}$ is defined by $(x^{in}_m, y^{in}_n)=(x^{out}_m+\text{crop-start}\_x_i, y^{out}_j-\text{crop-start}\_y_j)$. A scale transformation $(x^{out}, y^{out})=\text{Scale}(x^{in}, y^{in})$ may be $(x^{out}, +y^{out})=(s_x \cdot x^{in}, s_y \cdot y^{in})$ with scaling factors $s_x$ and $s_y$ in x and y direction respectively. An inverse scale transformation $\text{Scale}^{-1}$ is defined by $(x^{in}, y^{in})=(s_x^{-1} \cdot x^{out}, s_y^{-1} \cdot y^{out})$. A transfer function T is defined by applying homography, crop and scale sequentially, i.e. T is defined by $(x^{out}, y^{out})=\text{Scale}(\text{Crop}(f_H(x^{in}, y^{in})))$ and $(x^{out}, y^{out})=T(x^{in}, y^{in})$.

In the interpolation sub-step, one may sequentially interpolate all values of output image $(x^{out}, y^{out})$ directly from the input image via transfer function T. For example, one may start with calculating values $(x^{out}_m, y^{out}_n)$ at an arbitrary starting point having coordinates (m, n) of the output image. For this, one calculates coordinates (m', n') of input image $(x^{in}, y^{in})$ that are to be included for calculating values $(x^{out}_m, y^{out}_n)$ at the particular coordinates (m, n) of the output image. Coordinates (m', n') in the input image may be obtained by applying an inverse transfer function $T^{-1}$ to all output coordinates (m, n), i.e. $T^{-1}(x^{out}_m, y^{out}_n)$ or $f_H^{-1}(\text{crop}^{-1}(\text{scale}^{-1}(x^{out}_m, y^{out}_n)))$ for all (m, n). In general, $T^{-1}$ may not map each coordinate (m, n) on one coordinate (m', n'), but map each coordinate on a segment of neighboring coordinates (m', n'). For calculating the values $(x^{out}_m, \text{you'n})$, the entire segment or parts of the segment of neighboring coordinates (m', n') may be taken into account. For obtaining values $(x^{out}_m, y^{out}_n)$ of the output image at coordinates (m, n), in a first step a re-sampling function R as known in the art may be evaluated for all neighboring coordinates (m', n') according to $T(x^{out}_m, y^{out}_n)=\text{Resample}(\text{Tin}, x^{in}_m, y^{in}_n)$. The re-sampling may be performed by methods known in the art such as nearest neighbor, bi-linear, or bi-cubic.

After values $(x^{out}_m, y^{out}_n)$ are determined, one may perform the steps above for calculating the values $(x^{out}_o, y^{out}_p)$ at additional coordinates (o, p), etc. This is repeated until all values $(x^{out}, y^{out})$ of the output image are obtained. In various embodiments, the calculation as described above is performed for a plurality of output coordinates or even for all output coordinates in parallel. In some STC image rectification embodiments, the calculations described here may be performed by a CPU (Central Processing Unit). In other STC image rectification embodiments and for faster image processing, the calculations described here may be performed by a GPU (Graphics Processing Unit). The STC image rectification may be performed in different color domains, e.g. RGB, YUV, YUV420 and further color domains known in the art.

Figure 3A:
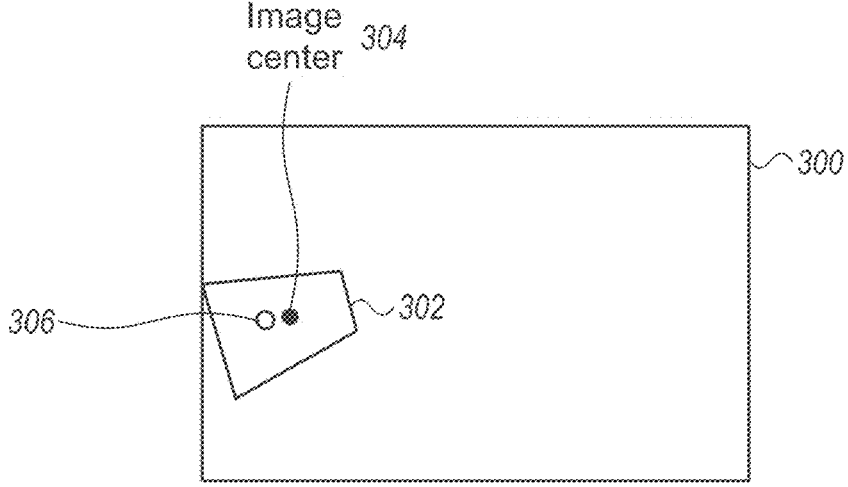
FIG. 3A shows an FOV of the entire range of the OPFE scanning positions with an exemplary object.

FIG. 3A shows S-FOV$_T$ 300 in the object domain. 302 represents a N-FOV$_T$ corresponding to a particular OPFE position within 300. 304 represents the object point in the scene whose image point is located at the center of the image sensor. 306 represents an arbitrary selected particular object point in the scene that is included in N-FOV$_T$ 302.

Figure 3B:
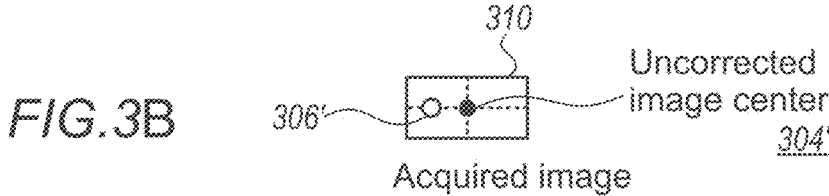
FIG. 3B shows details of the acquired image of the exemplary object in FIG. 3A.
Figure 3C:
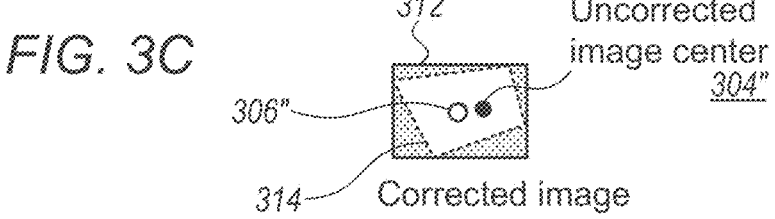
FIG. 3C shows details of a corrected image of the acquired image in FIG. 3B.

FIG. 3B shows an acquired Tele image 310 having a center 304' and including an image point 306' of object point 306. FIG. 3C shows a corrected image 312 generated by applying the geometric transformation described above to image 310. 314 is the boundary of the image data in the corrected image, i.e. outside of the boundary (dotted area) there is no image data available. 304" and 306" are the locations of image points 304' and 306' respectively in the corrected image.

Figure 3D:
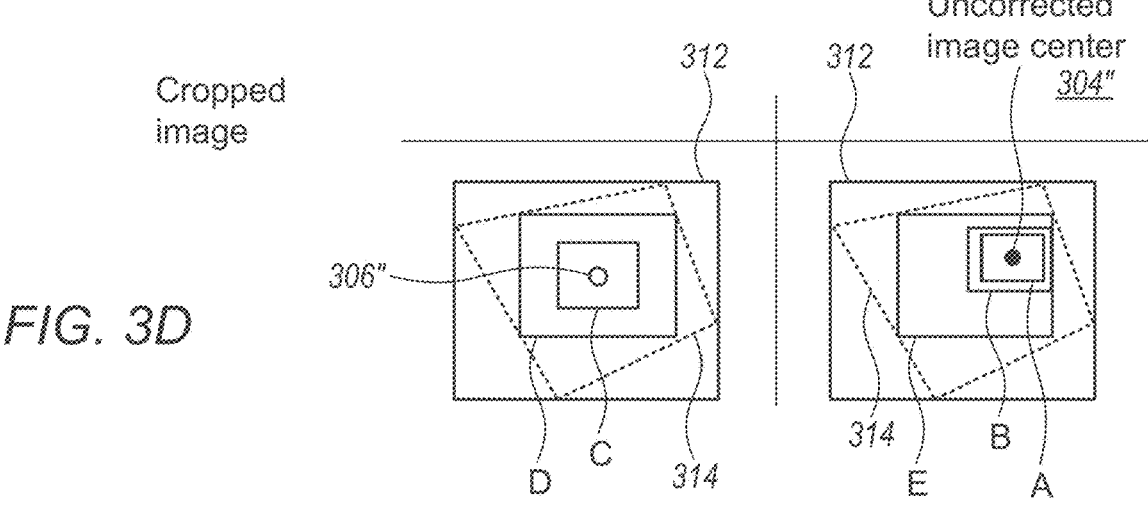
FIG. 3D shows details of a cropped image of the corrected image in FIG. 3C.

FIG. 3D shows exemplarily different options for rectangularly cropping corrected image 312 shown in FIG. 3C and generating an output image as described herein. One can see that the image data that is located at the output image center (OIC) depends on the selected cropping criteria. In the examples marked "D" and "C", crop selection criteria are selected so that particular image point 306' is located at the OIC. Cropping option "D" is selected so that two criteria are fulfilled: (i) "particular image point 306' is located at the OIC" and (ii) "the largest rectangular image for the given POV is achieved". Cropping option "C" is selected so that the criterion "particular image point 306' is located at the OIC" is fulfilled. Additional crop selection criteria are depicted in the examples marked "A", "B" and "E". Cropping option "A" is selected so that the criterion "image center 304' is located at the OIC" is fulfilled. Cropping option "B" is selected so that two criteria are fulfilled: (i) "image center 304' is located at the OIC" and (ii) "the largest rectangular image for the given POV is achieved". Cropping option "E" is selected so that for the output image the criterion "the largest rectangular image for the given POV is achieved" is fulfilled. In other examples (not shown), a cropping option may be selected so that two criteria are fulfilled: (i) "image center 304' is located at the OIC" and (ii) "the largest rectangular image for all possible POVs is achieved". It may not always be possible or beneficial to locate the OIC exactly at a particular image position ("ideal OIC") such as e.g. the image center, but in proximity of the ideal OIC. Proximity of the ideal OIC may be expressed as a percentage of the image sensor size (e.g. OIC may be located<10% of image sensor width from the ideal OIC) or as a distance in pixels (e.g. OIC may be located less than a distance of 10× pixel size away from the ideal OIC).

In yet other examples (not shown), a cropping option may be selected so that that the criterion "the largest rectangular image for all possible POVs is achieved" is fulfilled. In yet other examples (not shown), a cropping option may be selected so that that the criterion "the largest rectangular image for a particular plurality of POVs is achieved" is fulfilled. The particular plurality of POVs may cover all possible POVs or a subset thereof.

Figure 4:
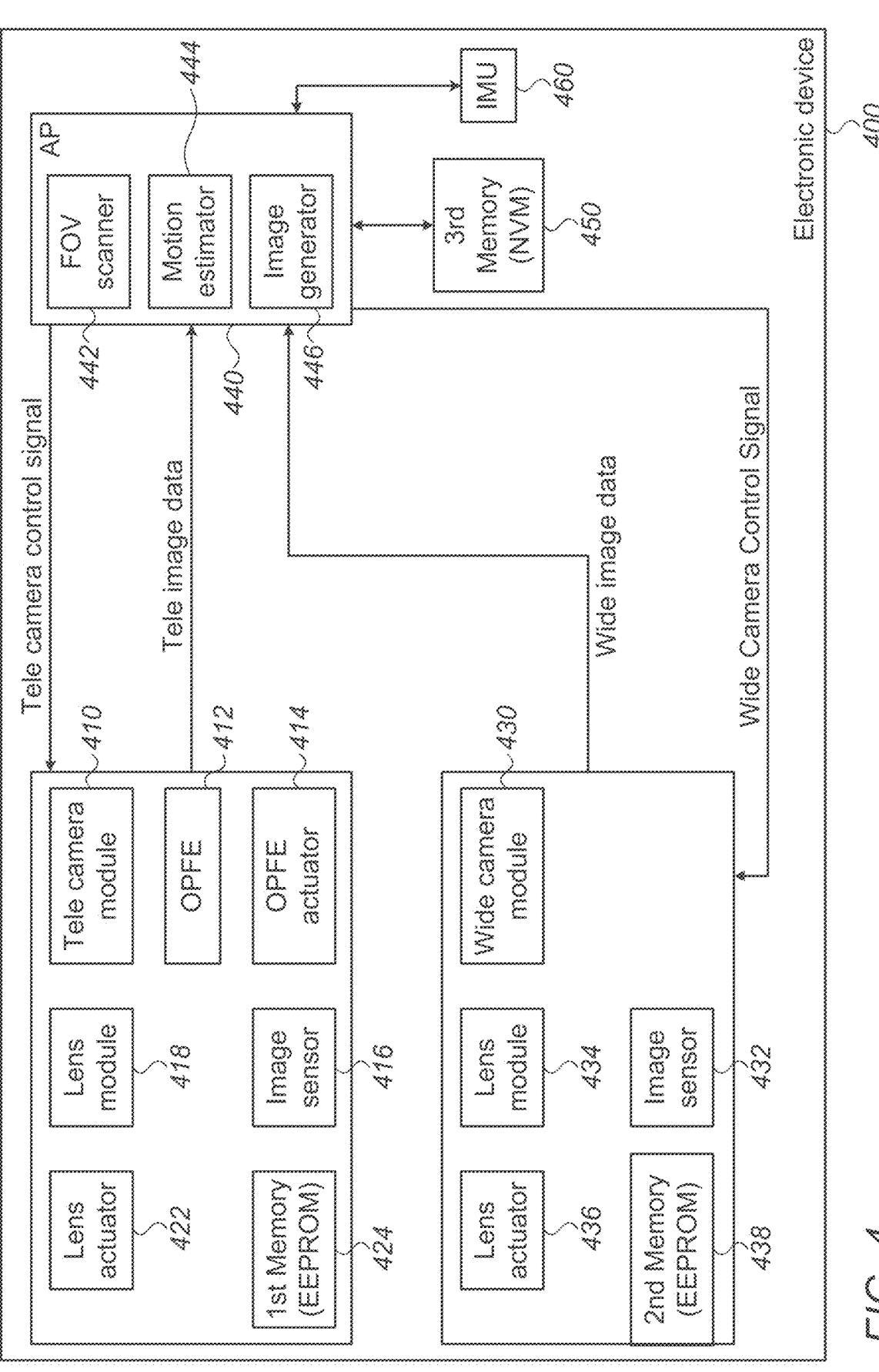
FIG. 4 shows schematically an embodiment of an electronic device including multi-aperture cameras with at least one scanning Tele camera.

FIG. 4 shows schematically an embodiment of a mobile electronic device ("electronic device") numbered 400 and including multi-aperture cameras with at least one STC. Electronic device 400 may e.g. be a smartphone, a tablet, a laptop, etc., Electronic device 400 comprises a first STC module 410 that includes an OPFE 412 for FOV scanning, and a Tele lens module 418 that forms a Tele image recorded by a first image sensor 416. Image sensor 416 has an active sensor area defined by an active sensor width and an active sensor height which performs the actual light harvesting, and an inactive area that does not perform light harvesting. A Tele lens actuator 422 may move lens module 418 for focusing and/or optical image stabilization (OIS). Electronic device 400 may further comprise an application processor (AP) 440 that includes a FOV scanner 442, a motion estimator 444 and an image generator 446. STC 410 may have an effective focal length ("EFL") of EFL=5 mm-50 mm. A sensor diagonal ("SD") of image sensor 416 may be SD=3 mm-15 mm.

Calibration data may be stored in a first memory 424, e.g. in an EEPROM (electrically erasable programmable read only memory), in a second memory 438, or in a third memory 450, e.g. in a NVM (non-volatile memory). Calibration data may include STC calibration data and DC calibration data. Electronic device 400 further comprises a Wide ("W") (or Ultra-Wide, "UW") camera module 430 with a $FOV_W$, $FOV_{UW}$>N-$FOV_T$ that includes a second lens module 434 that forms an image recorded by a second image sensor 432. A second lens actuator 436 may move lens module 434 for focusing and/or OIS.

In use, a processing unit such as AP 440 may receive respective first and second image data from camera modules 410 and 430 and supply camera control signals to camera modules 410 and 430. FOV scanner 442 may receive commands from a human user or a program for directing the N-$FOV_T$ to particular POVs in a scene. In some embodiments, the commands may include a single request for directing N-$FOV_T$ to one particular POV. In other examples, the commands may include a series of requests e.g. for serially directing N-$FOV_T$ to a plurality of particular POVs. FOV scanner 442 may be configured to calculate a scanning order given the requested particular POVs. FOV scanner 442 may be configured to supply control signals to OPFE actuator 414, which may, in response to the control signals, rotate OPFE 412 for scanning N-$FOV_T$. In some embodiments, FOV scanner 442 may additionally supply control signals to OPFE actuator 414 for actuating OPFE 412 for OIS.

Electronic device 400 further comprises an inertial measurement unit (IMU, or "Gyro") 460 that may supply information on the motion of 400. Motion estimator 444 may use data from IMU 460, e.g. for estimating hand motion caused by a human user. In some embodiments, motion estimator 444 may use additional data. For example, image data from camera 410 and/or from camera 430 may be used to estimate an "optical flow" from a plurality of images as known in the art. Motion estimator 444 may use data from IMU 460 and may use as well optical flow data for estimating motion of 400 with higher accuracy. The information on motion of 400 may be used for OIS or for the homography transformation described above. In other embodiments, only optical flow data estimated from image data of camera 410 and/or camera 430 may be used for estimating motion of 400. Image generator 446 may be configured to generate images and image streams respectively as e.g. described in FIG. 2C. In some embodiments, image generator 446 may be configured to use only first image data from camera 430. In other embodiments, image generator 446 may use image data from camera 410 and/or camera 430.

Figures 5, 6:
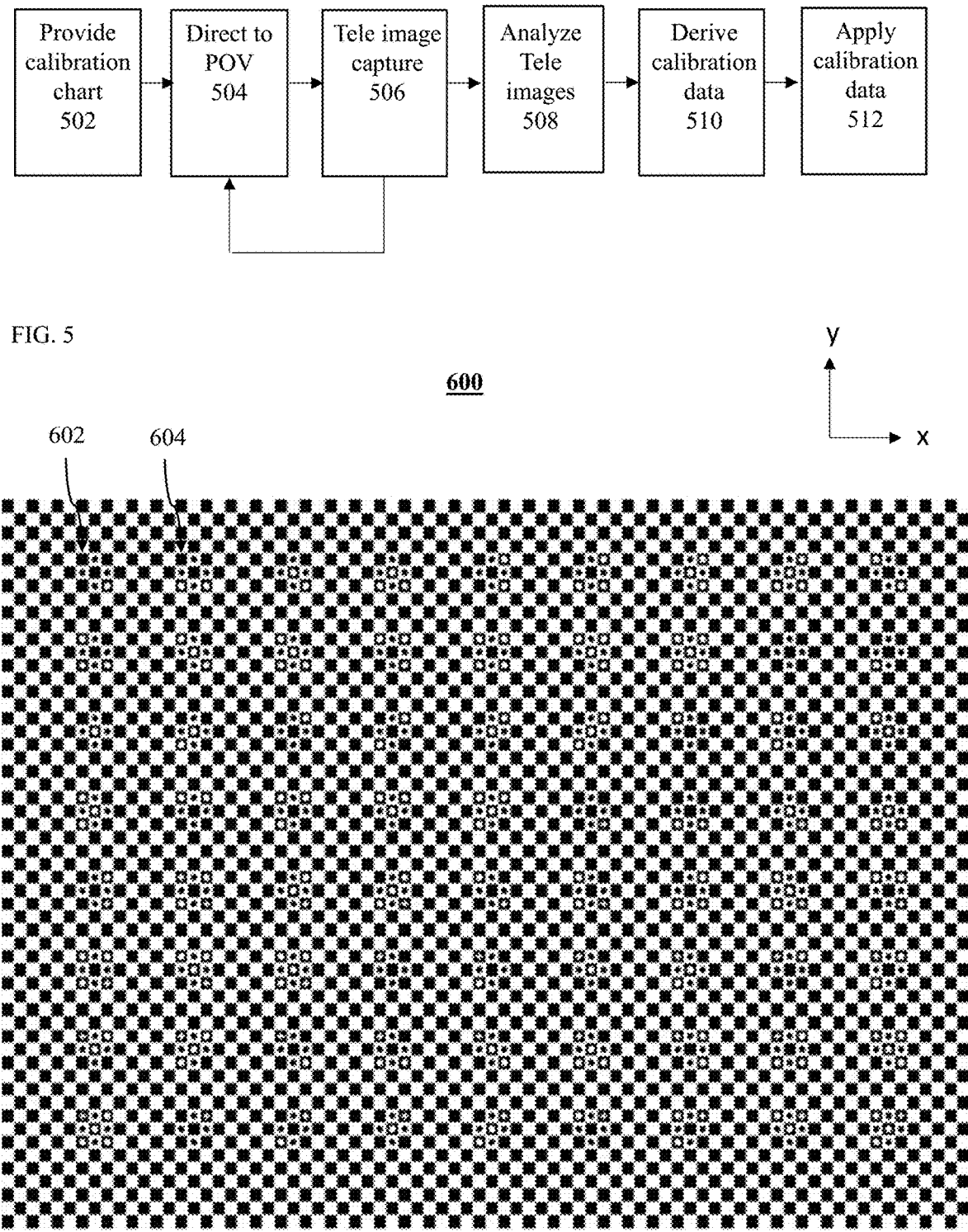
FIG. 5 shows a method for a STC calibration process described herein.
FIG. 6 shows an exemplarily calibration chart that may be used for the calibration method described in FIG. 5.

FIG. 5 shows a method for a STC calibration process described herein. The calibration process allows to derive calibration data for a single scanning Tele camera ("STC calibration") or for a dual-camera ("DC") including a STC and a Wide camera having a $FOV_W$>N-$FOV_T$ ("DC calibration"). Goal of the calibration process is to connect between three parameters for all possible POVs: a specific OPFE position which is defined by a position sensor value pair, the POV associated with this specific OPFE position as well as the POV aberrations associated with this specific POV.

In a first example (calibration example 1 or "CE1"), the calibration process refers to a STC that scans in 2 dimensions by rotating an OPFE along two axes, wherein the amplitude of the rotation is measured by two or more position sensors (e.g. Hall sensors), a first and a second position sensor P1 and P2 respectively. The STC's POV is measured by the value pair p1 and p2 of P1 and P2 respectively. In a first step 502, a calibration chart ("CC") is provided. A suitable CC includes location identifiers (such as location identifiers 602 and 604, see FIG. 6) which allow to determine the location on the chart. When capturing a suitable CC at a given distance with a STC, at least one location identifier is present in N-$FOV_T$ for all POVs in S-$FOV_T$. By means of the location identifier, the STC's POV with respect to the CC can be determined. The location identifiers may e.g. be symbols encoding location information, spread in sufficiently high frequency all over the checkerboard. Additionally, a suitable CC includes angular identifiers that allow to determine the relative angular tilt and rotation between the CC and a STC's image of the CC. The angular identifiers may e.g. be lines present in a checkerboard. An example of a suitable CC is shown in FIG. 6. The size of the CC and the distance between the STC and the CC is to be selected so that the entire S-$FOV_T$ is included in the FOV covered by the CC.

In CE1, a list of N specific value pairs (p1, p2) may be defined for a specific STC design. In some embodiments, the list may include N=10 value pairs (p1, p2) 1, . . . , (p1, p2) 10. In other embodiments, the list may include N=10-20 or even more value pairs. According to a first criterion for value pair selection, the value pairs may be selected so that the STC must capture a minimum number of different POVs in the calibration process (or, in other words, a minimum number of repetitions of steps 504 and 506 is desired).

For a second example ("CE2") for DC calibration, in step 502 another CC may be required, wherein the CC may or may not be a checkerboard. The STC of CE2 fulfills the same attributes as for CE1. Also in CE2, a list of N specific position sensor value pairs (p1, p2), each value pair associated with a specific OPFE position, may be defined for a specific STC design. In some embodiments, the list may include N=200 value pairs (p1, p2)$_1$, . . . , (p1, p2)$_{200}$. In other embodiments, the list may include N=100-300 or even more value pairs.

By tilting the OPFE to a specific OPFE position, in CE1 and CE2 e.g. defined by (p1, p2)$_1$, in step 504 the STC is directed to a (yet unknown) POV on the CC.

In step 506, one or more STC images are captured. For DC calibration and for CE2, a second sub-step of step 506 is required, where STC images are captured along W images captured by the Wide camera. Capturing STC images along W images means here that the images are captured at a same dual-camera position and orientation. In general, the capture may be simultaneous, but this is not mandatory.

In some embodiments, the capturing of the STC images along the Wide images may be performed together and in one single step, e.g. by a same operator.

In other examples, the two steps may be performed separately and e.g. by different operators. For example and for calibrating a STC with respect to a first CC, a first operator may capture one or more STC images at a specific OPFE position. The STC which is calibrated with respect to the first CC may be included by a second operator into a dual-camera which is used for capturing a second CC (which may be or may be not identical to the first CC) with the STC at a specific OPFE position along with one or more W images for calibrating the STC with respect to the W camera of the dual-camera. Steps 504 and 506 are performed repeatedly according to the number N of value pairs, so that one or more STC images are captured at each of the N OPFE positions (or value pairs). The repetition of steps 502 and 504 for the plurality of OPFE positions may be performed for example in a predetermined timeframe. The predetermined timeframe may e.g. be 10 s or 5 s. For example, the first operator may be a camera module manufacturer that manufactures the STC and the second operator may be a phone manufacturer that includes the STC into a dual-camera and the dual-camera into a mobile device. In some embodiments, the second sub-step of step 506 does not include capturing additional STC and W images, but includes receiving external calibration data between the STC and the Wide camera.

In step 508, the STC images are analyzed. Aim is to assign a POV and a respective POV aberration to the specific OPFE (or value pairs) position of step 504. The analysis includes to use the CC's location identifiers that appear in a STC image to determine the POV from which it was captured, as well as to use the CC's angular identifiers along with GT images to determine the POV aberrations.

For CE1, the analysis includes to use the CC's location identifiers that appear in a STC image to determine the POV from which it was captured, as well as to use the CC's angular identifiers along with ground truth images to determine the POV aberrations.

In a first sub-step of CE1, a specific POV$_i$ is assigned to the value pair (p1, p2)$_i$.

In a second sub-step of CE1, the STC image is compared to a ground truth image of the CC at the respective POV. In this comparison it is determined which image transformation parameters transform the STC image into the CC's ground truth image. In some embodiments, three image transformation parameters may be used. For DC and CE2, POVs and respective POV aberrations are determined by comparing the STC images and the Wide images captured in step 506.

In step 508 of CE1, the first and the second sub-step are performed for all value pairs (p1,p2)$_1$, . . . , (p1,p2)$_N$, so that to each value pair (p1,p2)$_i$ a specific POV$_i$ and image transformation parameters are assigned.

In step 510, from the analysis in step 508, calibration data is derived. In some embodiments, the calibration data is represented by a bi-directional data polynomial. In other examples, the calibration data is represented by a bi-directional Look-Up-Table (LUT) polynomial. In all examples, STC calibration data includes a function that can be used to translate any OPFE position to a STC image's POV aberrations with respect to a checkerboard and/or STC's POV. DC calibration data can be used to translate any OPFE position to a STC image's POV aberrations with respect to the W camera and/or STC's POV within FOV$_W$. Vice versa, any POV aberration of an STC image with respect to a W camera's image can be translated into a STC POV within FOV$_W$ and/or to an OPFE position (thus "bi-directional"). In yet other examples, STC calibration data is represented by a LUT which comprises a multitude of OPFE positions with associated values for STC images' POV aberrations with respect to the CC and/or STC's POVs. DC calibration data is represented by a LUT which comprises a multitude of OPFE positions with associated values for STC images' rotation angles with respect to the Wide camera's images and/or Tele POVs within FOV$_W$. For CE1, a function is determined which approximates the relation between all the value pairs (p1, p2) 1, . . . , (p1, p2)$_N$ and their assigned specific POVs, POV$_1$, . . . , POV$_N$, as well as their assigned image transformation parameters. This function is generalized, meaning that it is used for bi-directionally translating between all possible OPFE position value pairs, their POVs and image transformation parameters for image rectification. According to a second criterion for value pair selection, the value pairs may be selected so that the generalization of the function leads to a minimum aggregated error ("AE"). "AE", which is to be minimized, refers here to an error function that depends on the deviation of the STC images that underwent the POV correction from their respective ground truth images for all possible POVs (or a number of POVs that is sufficiently large to approximate statistically all possible POVs). In some embodiments, some compromise between fulfilling the first or the second criterion for value pair selection is made.

For CE2, the calibration data derived is included in a LUT. The LUT includes the N OPFE positions (value pairs), the POV associated with each value pair as well as its respective POV aberration. This implies that not for all possible OPFE positions there is explicit calibration data. So for rectifying a STC image with CE2 at an OPFE position which is not included in the LUT, one may approximate a POV and its POV aberrations. In some embodiments for approximation, one may use the calibration values which are associated with one OPFE position which is, from all the N OPFE positions, located closest to the current OPFE position. Closest may be defined here by a distance metrics known in the art, e.g. a quadratic distance of the respective value pairs ($sqrt((p1-p1c)^2+(p2-p2_c)^2)$) may be smallest, where p1, p2 is the current OPFE position, and p1c, p2$_c$ are values included in the LUT. In other examples for approximation, one may use a weighted average of a plurality of calibration values which are associated with a plurality of OPFE positions which are, from all the N OPFE positions, located closest to the current OPFE position.

In step 512, the calibration data are applied to the STC images for correcting POV aberrations.

FIG. 6 shows an exemplarily CC 600 that may be used for the calibration method described in FIG. 5. CC 600 includes 72 location identifiers, which are distributed in rows of 9 (oriented parallel x) and 8 columns (oriented parallel y). Exemplarily, the two first location identifiers of the first row are marked 602 and 604 respectively. A location identifier is located at a defined distance from a CC reference point, e.g. the upper left corner of CC. For calibrating with CC 600 at different camera-CC distances, one may adapt the size of CC 600 so that at least one location identifier is present in N-FOV$_T$ for all POVs in S-FOV$_T$. CC 600 includes additionally angular identifiers, which in this example are represented by the vertical and horizontal lines of the checkerboard.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present invention.

What is claimed is:

1. A system, comprising:
a Wide camera with a Wide field of view (FOV$_W$);
a Tele folded camera with a Tele field of view (FOV$_T$) which fulfills FOV$_T$<FOV$_W$, wherein the Tele folded camera includes an optical path folding element (OPFE) and a Tele image sensor and has a scanning capability enabled by OPFE tilt in one or more directions, wherein the scanning capability is used to direct the Tele folded camera towards a point of view (POV) of a scene and to capture a Tele image from the POV or to perform optical image stabilization (OIS) and to capture a Tele image while performing the OIS, and wherein the Tele image has a respective POV aberration in the shape of a non-rectangular tetragon introduced by the OPFE tilt in one or more directions; and
a processor configured to digitally correct the respective POV aberration in the shape of a non-rectangular tetragon.

2. The system of claim 1, wherein the processor configuration to digitally correct the POV aberration includes a configuration to apply a geometric transformation to the captured Tele image to obtain a respective aberration-corrected image.

3. The system of claim 1, wherein the POV aberration is corrected using calibration data.

4. The system of claim 3, wherein the calibration data is stored in a non-volatile memory.

5. The system of claim 3, wherein the calibration data includes data on calibration between tilt positions of the OPFE in one or two directions and corresponding POVs in the scene.

6. The system of claim 3, wherein the calibration data includes data on calibration between a Tele image and a Wide image.

7. The system of claim 3, wherein the calibration data includes data on calibration between tilt positions of the OPFE in one or two directions and respective positions of FOV$_T$ within FOV$_W$.

8. The system of claim 2, wherein the geometric transformation is a homography transformation.

9. The system of claim 8, wherein the homography transformation includes a motion-based calculation using a stream of frames from the Wide camera.

10. The system of claim 9, wherein the homography motion-based calculation further uses inertial measurement unit information.

11. The system of claim 2, wherein the geometric transformation is a non-affine transformation.

12. The system of claim 1, wherein the processor configuration to digitally correct the POV uses calibration information captured during a camera calibration process.

13. The system of claim 1, wherein the OPFE is a prism.

14. The system of claim 1, further comprising cropping the aberration-corrected image to obtain a respective aberration-corrected cropped (ACC) image that has an ACC image center, an ACC image size and an ACC image width/height ratio.

15. The system of claim 14, further comprising scaling the ACC image to obtain a respective aberration-corrected cropped and scaled output image that has an output image center (OIC), an output image size and an output image width/height ratio.

16. The system of claim 15, wherein the image sensor has an image sensor center, an active sensor width and an active sensor height, and wherein the OIC coincides with the image sensor center.

17. The system of claim 15, wherein the OIC is selected such as to achieve a largest possible rectangular crop image size for a particular output image width/height ratio.

18. The system of claim 15, wherein the OIC is selected such that the output image covers a maximum area within a scene.

19. The system of claim 1, wherein the system is included in a mobile device.

20. The system of claim 19, wherein the mobile device is a smartphone.

\* \* \* \* \*